(12) United States Patent
Bodin et al.

(10) Patent No.: US 10,491,397 B2
(45) Date of Patent: Nov. 26, 2019

(54) VERIFYING THE INTEGRITY OF DATA FROM EQUIPMENT ON BOARD A VEHICLE

(75) Inventors: Pascal Bodin, Grasse (FR); Jacques Chambon, Grasse (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/007,614

(22) PCT Filed: Mar. 23, 2012

(86) PCT No.: PCT/FR2012/050615
§ 371 (c)(1),
(2), (4) Date: Sep. 25, 2013

(87) PCT Pub. No.: WO2012/131245
PCT Pub. Date: Oct. 4, 2012

(65) Prior Publication Data
US 2014/0025955 A1 Jan. 23, 2014

(30) Foreign Application Priority Data

Mar. 25, 2011 (FR) ...................................... 11 52491

(51) Int. Cl.
*H04L 9/32* (2006.01)
*G07C 5/04* (2006.01)
(Continued)

(52) U.S. Cl.
CPC ............ *H04L 9/3247* (2013.01); *G06F 21/64* (2013.01); *G07C 5/04* (2013.01); *G07C 5/10* (2013.01);
(Continued)

(58) Field of Classification Search
CPC ... H04L 63/0823; H04L 9/328; H04L 9/3281; H04L 63/0428; H04L 9/3247;
(Continued)

(56) References Cited

U.S. PATENT DOCUMENTS 8,689,323 B2 * 4/2014 Gut ........................ G01D 9/005
455/411
9,196,099 B2 * 11/2015 Grill ....................... G07C 5/085
(Continued)

FOREIGN PATENT DOCUMENTS

| DE | 10 2008 048162 A1 | 3/2010 | |
| EP | 2 259 231 A1 | 12/2010 | |
| EP | 2259231 A1 * | 12/2010 | ............. G07C 5/008 |

OTHER PUBLICATIONS

Commission Regulation, Jun. 2002, online document retrieved on Jun. 3, 2015. Retrieved from <URL:http://eur-lex.europa.eu/LexUriServ/LexUriServ.do?uri=OJ:L:2002:207:0001:0252:EN:PDF>.*
(Continued)

*Primary Examiner* — Ali S Abyaneh
(74) *Attorney, Agent, or Firm* — Knobbe, Martens, Olson & Bear, LLP (57) ABSTRACT

A method of verifying data integrity performed by on-board equipment in a vehicle, the method comprising:
sending data for signing to an electronic chronotachograph on board said vehicle;
receiving a signature of said data from said electronic chronotachograph;
storing said data and said signature; and
transmitting the stored data and signature to a verification device.

37 Claims, 3 Drawing Sheets

(51) Int. Cl.
  G07C 5/10 (2006.01)
  G06F 21/64 (2013.01)
  G07C 5/00 (2006.01)
  G07C 5/02 (2006.01)
  G07C 5/08 (2006.01)

(52) U.S. Cl.
  CPC .............. *G07C 5/008* (2013.01); *G07C 5/02* (2013.01); *G07C 5/085* (2013.01); *H04L 2209/84* (2013.01)

(58) Field of Classification Search
  CPC ......... G06F 9/5016; G06F 21/64; G07C 5/04; G07C 5/10; H04N 21/8358
  USPC ......................................................... 713/176
  See application file for complete search history.

(56) References Cited

U.S. PATENT DOCUMENTS

| | | | |
|---|---|---|---|
| 2002/0120856 A1 | 8/2002 | Schmidt et al. | |
| 2007/0168125 A1* | 7/2007 | Petrik | B60R 16/0231 701/469 |
| 2009/0327760 A1* | 12/2009 | Lindinger | G07C 5/0858 713/193 |
| 2010/0004813 A1* | 1/2010 | Lindinger | G07B 15/063 701/31.4 |
| 2010/0250053 A1 | 9/2010 | Grill et al. | |
| 2010/0322423 A1 | 12/2010 | Boehler et al. | |
| 2011/0208387 A1* | 8/2011 | Bosch | G07C 5/085 701/33.4 |
| 2012/0191667 A1* | 7/2012 | Kopylovitz | G06F 3/0608 707/692 |
| 2014/0380494 A1* | 12/2014 | Ovely | G06F 21/64 726/26 |

OTHER PUBLICATIONS

Palacio, Commission Regulation (EC) No. 1360/2002, [online] Jun. 2002 [retrieved on May 22, 2015]. Retrieved from the internet<URL: http://eur-lex.europa.eu/LexUriServ/LexUriServ.do?uri=OJ:L:2002:207:0001:0252:EN:PDF>.*

International Search Report dated Aug. 2, 2012 for PCT/FR2012/050615 filed Mar. 23, 2012, 7 pages.

* cited by examiner

VERIFYING THE INTEGRITY OF DATA FROM EQUIPMENT ON BOARD A VEHICLE

RELATED APPLICATIONS

This application is the U.S. National Phase of Application No. PCT/FR2012/050615 entitled "CHECKING THE INTEGRITY OF DATA FROM EQUIPMENT ON BOARD A VEHICLE" filed Mar. 23, 2012, which designated the United States, and which claims the benefit of French Application No. 1152491 filed Mar. 25, 2011.

BACKGROUND OF THE INVENTION

The invention relates to the general field of vehicles fitted with on-board equipment for managing a fleet of vehicles.

Vehicle fleet management applications are now widespread. The services they offer include in particular determining the position of the vehicle, returning vehicle positions to a central site, sending instructions to a vehicle from the central site, etc. This type of application makes use of equipment on board the vehicle, e.g. equipment containing a satellite position-determining device and capable of communicating with the central site.

In certain applications, it is necessary to ensure the integrity of the data generated by the on-board equipment. By way of example, this may apply to functions serving to verify the routes followed, or the way in which the vehicle is utilized. In order to ensure data integrity, it is known to make use of an asymmetric-key cryptographic mechanism. Nevertheless, it is known that that type of mechanism requires means that are considerable, in particular for distributing private keys and for configuring pieces of equipment.

Furthermore, it is mandatory to install an electronic chronotachograph in all new trucks weighing more than 3.5 (metric) tonnes (t). When data is extracted from an electronic chronotachograph via its front-face connector, the data is signed. This signature is based on an asymmetric-key cryptographic mechanism and serves to ensure that the data is authentic (that it does indeed come from the chronotachograph in question) and to ensure the integrity of the data (i.e. that it has not been modified compared with what it was when generated in the chronotachograph).

OBJECT AND SUMMARY OF THE INVENTION

The invention seeks to facilitate combating fraud concerning equipment on board a vehicle. In particular, the invention seeks to make it possible to verify the integrity of data from on-board equipment, while avoiding certain of the above-mentioned drawbacks of the prior art.

To this end, the invention provides an electronic chronotachograph for use on board a vehicle, the chronotachograph comprising:
   a module for receiving data for signing from equipment on board said vehicle;
   a module for determining a signature for said data; and
   a module for sending said signature to said on-board equipment.

In corresponding manner, the invention provides equipment for use on board a vehicle, the equipment comprising:
   a module for sending data for signing to an electronic chronotachograph on board said vehicle;
   a module for receiving a signature of said data from said electronic chronotachograph;
   a module for storing said data and said signature; and
   a module for transmitting the stored data and signature to a verification device.

The invention also provides a vehicle having on-board equipment in accordance with the invention and an electronic chronotachograph in accordance with the invention and connected to said equipment.

By using the signature module of the chronotachograph, the data generated by the on-board equipment can be signed without needing a private key or a signature module that are specific to the on-board equipment. In other words, the invention makes it possible to share the infrastructure associated with the asymmetric-key cryptographic mechanism of the chronotachograph. There is no need to distribute private keys that are specific to the pieces of equipment on board the vehicles of a fleet.

This simplifies providing on-board equipment that is required to supply signed data by making use, for this purpose, of the signature means that are already present in the chronotachograph.

The invention requires the chronotachograph to be modified so that it is capable not only of transmitting signed data as obtained from measurement data generated by the chronotachograph itself, but also of receiving data for signing (regardless of its nature, being measurements or other kinds of data) and of providing in return data that has been signed with a corresponding signature. In particular, the protocol for communicating with the chronotachograph must be modified so as to take this new function into account and make it possible to dialog with the chronotachograph in appropriate manner.

In a first variant implementation, communication for sending data for signing to the chronotachograph takes place via the front-face connector that is usually used to extract the data generated by the chronotachograph, with the chronotachograph responding by returning data signed with the corresponding signature via the same connector.

In a second variant implementation, communication for sending data for signing to the chronotachograph takes place via another communications interface available to the chronotachograph. This makes it possible to avoid interfering with the process for extracting data generated by the chronotachograph, which process usually takes place via the front-face connector. In this second variant implementation, the chronotachograph responds by returning data signed with the corresponding signature via that other communications interface.

In both variant implementations, it can thus be seen that it is possible to make use of a communications interface that is already present on the chronotachograph in order to perform the invention.

The verification device enables a third party to read the data and the signature, thus enabling the third party to verify the integrity of the data. By way of example, the verification device may be at the central site of a transport company, or it may be a portable device used on the highway by a person carrying out inspections.

Since the on-board equipment and the chronotachograph are two distinct devices, the verification device may communicate directly with the on-board equipment using a protocol that is different from the communication protocol that is used between the on-board equipment and the chronotachograph. The on-board equipment and the chronotachograph may be designed and installed separately. For example they may come from different manufacturers.

Correspondingly, the invention provides a signing method performed by an electronic chronotachograph on board a vehicle, the method comprising:

a step of receiving data for signing from equipment on board said vehicle;

a step of determining a signature for said data; and a step of sending said signature to said on-board equipment.

In corresponding manner, the invention provides a data storage method performed by on-board equipment in a vehicle, the method comprising:

a step of sending data for signing to an electronic chronotachograph on board said vehicle;

a step of receiving a signature of said data from said electronic chronotachograph;

a step of storing said data and said signature; and a step of transmitting the stored data and signature to a verification device.

The advantages mentioned above with reference to the on-board equipment, to the chronotachograph, and to the vehicle, apply in corresponding manner to the above-mentioned methods.

In an implementation of the storage method, the step of sending data comprises sending to the electronic chronotachograph at least one data submission request message together with at least some of the data for signing.

In an implementation, the step of sending data comprises sending to the electronic chronotachograph a message requesting the transfer of a signature for data that is sent together with said at least one data submission request.

The signature transfer request message and the data submission request message may be a single message or they may be different messages.

In an implementation of the storage method, the format of the data submission request message and/or of the data signature request message complies with the standardized protocol described in Annex 1B of Regulation (EEC) No. 3821/85, the byte "TRTP" of said message presenting a value ($PTD_S$, $PDT_D$) that is not defined in said standardized protocol.

In corresponding manner, in an implementation of the signing method, wherein the step of receiving data comprises receiving at least one message of format in compliance with the standardized protocol described in Annex 1B of Regulation (EEC) No. 3821/85, the byte "TRTP" of said message presenting a value that is not defined in said standardized protocol.

In other words, for communication between the on-board equipment and the chronotachograph, the invention proposes using a modified version of the above-mentioned protocol in which at least one additional value is defined for the byte TRTP in order to enable data to be sent and in order to enable a signature to be determined for the data. The use of a modified version of the above-mentioned standardized protocol serves to facilitate co-operation between pieces of on-board equipment and chronotachographs, some of which handle the modified version of the protocol while others handle only the standardized version.

The invention also provides a computer program including the instructions for executing the steps of the above storage method or of above signing method when said program is executed by a computer.

The program may use any programming language, and may be in the form of source code, object code, or of code intermediate between source code and object code, such as in a partially compiled form, or in any other desirable form.

The invention also provides a computer readable data medium or recording medium that includes the instructions of a computer program as mentioned above.

The above-mentioned recording media may be any type of entity or device capable of storing the program. For example, the medium may comprise storage means such as a read only memory (ROM), e.g. a compact disk (CD) ROM, or a microelectronic circuit ROM, or indeed magnetic recording means, e.g. a floppy disk or a hard disk.

The recording media may also correspond to a transmission medium such as an electrical or optical signal capable of being conveyed via an electrical or optical cable, by radio, or by other means. The program of the invention may in particular be downloaded from a network of the Internet type.

Alternatively, the recording media may correspond to an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings which show an implementation having no limiting character. In the figures.

DETAILED DESCRIPTION OF AN IMPLEMENTATION

Figure 1:
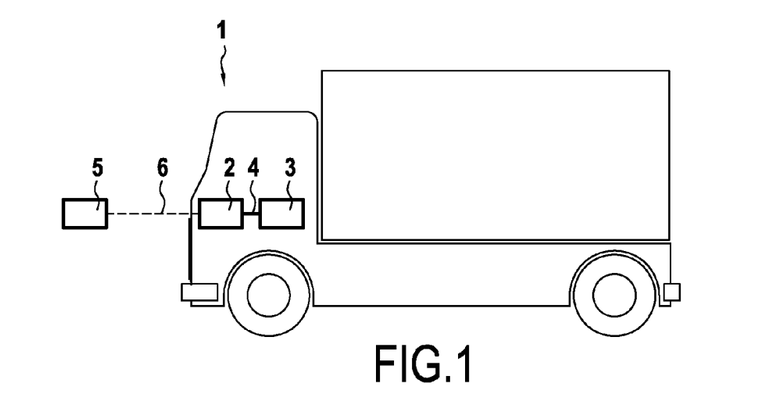
FIG. 1 is a diagram of a vehicle in an embodiment of the invention together with a verification device.

FIG. 1 shows a heavy goods vehicle (HGV) 1 fitted with on-board equipment 2 and an electronic chronotachograph 3. The equipment 2 and the chronotachograph 3 may communicate with each other via a link 4. FIG. 1 also shows a verification device 5 that can communicate with the equipment 2 via a link 6.

The equipment 2 serves to run applications for managing vehicle fleets. Thus, the equipment 2 can communicate with a central site (not shown), e.g. for determining the position of the vehicle 1, for returning vehicle positions to the central site, for sending instructions to the vehicle 1 from the central site, etc.

Figure 2:
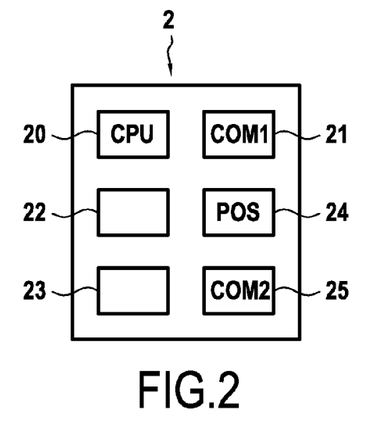
FIG. 2 is a diagram of the equipment on board the FIG. 1 vehicle.

The equipment 2 is shown diagrammatically in FIG. 2. In particular it comprises a microprocessor 20, a communications interface 21, a non-volatile memory 22, a volatile memory 23, a position-determining device 24, and a communications interface 25. The microprocessor 20 serves to execute programs stored in the non-volatile memory 22 while using the volatile memory 23. The communications interface 21 enables the equipment 2 to communicate with the chronotachograph 3 via the link 4, e.g. a wire link. The position-determining device 24 may be a device for global positioning by satellite of the GPS, Glonass, Galileo, etc. type. It is capable of generating data concerning position, instantaneous speed, date, and time. The data generated by the position-determining device 24 may be stored in the non-volatile memory 22 or in the volatile memory 23. The communications interface 25 enables the equipment 2 to communicate with the verification device 5 or with the central site over the link 6. The link 6 may be a wired link or a wireless link.

Figure 3:
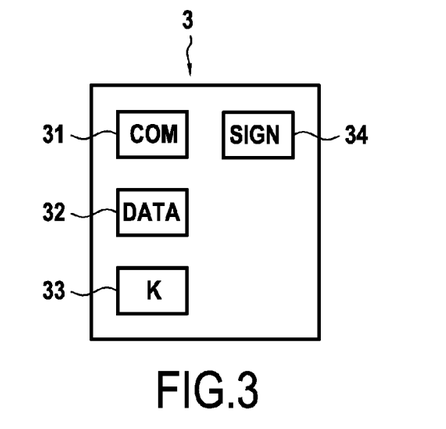
FIG. 3 is a diagram of an electronic chronotachograph of the FIG. 1 vehicle.

FIG. 3 shows the chronotachograph 3, which is an electronic chronotachograph of the kind required in all new trucks weighing more than 3.5 t. In particular, the chronotachograph 3 comprises a communications interface 31, a recorder 32, a memory 33 containing a private key K, and a signature module 34.

The recorder 32 records numerous items of information continuously: the identity of the driver, length of driving time, distance traveled, instantaneous speed, mean speed, maximum speed, etc.

The communications interface 31 includes a standardized connector situated in a front face and connected to the equipment 2 by the link 4, thereby giving access to the recorded data. Access is normally made to the data by using a smart card also referred to as a "company card" that gives access to all of the data about the drivers of the company in question. Nevertheless, it is possible to access the data without the company card. However some of the name data will then be masked.

The signature module 34 is suitable for performing an asymmetric-key cryptographic mechanism by using the key K. The key K is a private key associated with a public key $K_{pub}$. By way of example, the signature module 34 corresponds to a computer program executed by a processor (not shown) of the chronotachograph 3, to a specific electronic circuit (e.g. of the programmable logic circuit type), or to a combination of a computer program and a specific circuit.

When the data in the recorder 32 is extracted from the chronotachograph 3 via the front-face connector, it is signed by the signature module 34, using the key K. This signature serves to authenticate the data (i.e. that the data does indeed come from the chronotachograph in question) and to ensure the integrity of the data (i.e. that the data has not been modified compared with what it was when it was generated in the chronotachograph).

Figure 4:
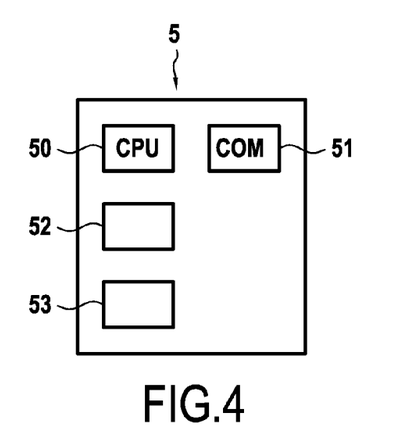
FIG. 4 is a diagram of the FIG. 1 verification device.

The verification device 5 is shown diagrammatically in FIG. 4. In particular, it comprises a microprocessor 50, a communications interface 51, a non-volatile memory 52, and a volatile memory 53. The microprocessor 50 serves to execute programs stored in the non-volatile memory 52, while using the volatile memory 53. The communications interface 51 enables the verification device 5 to communicate with the equipment 2 via the link 6.

By way of example, the verification device 5 may be situated at the central site of a transport company or it may be a portable device used on highways by a person responsible for inspecting vehicles in traffic, e.g. an officer verifying that the regulations in force are being applied.

Figure 5:
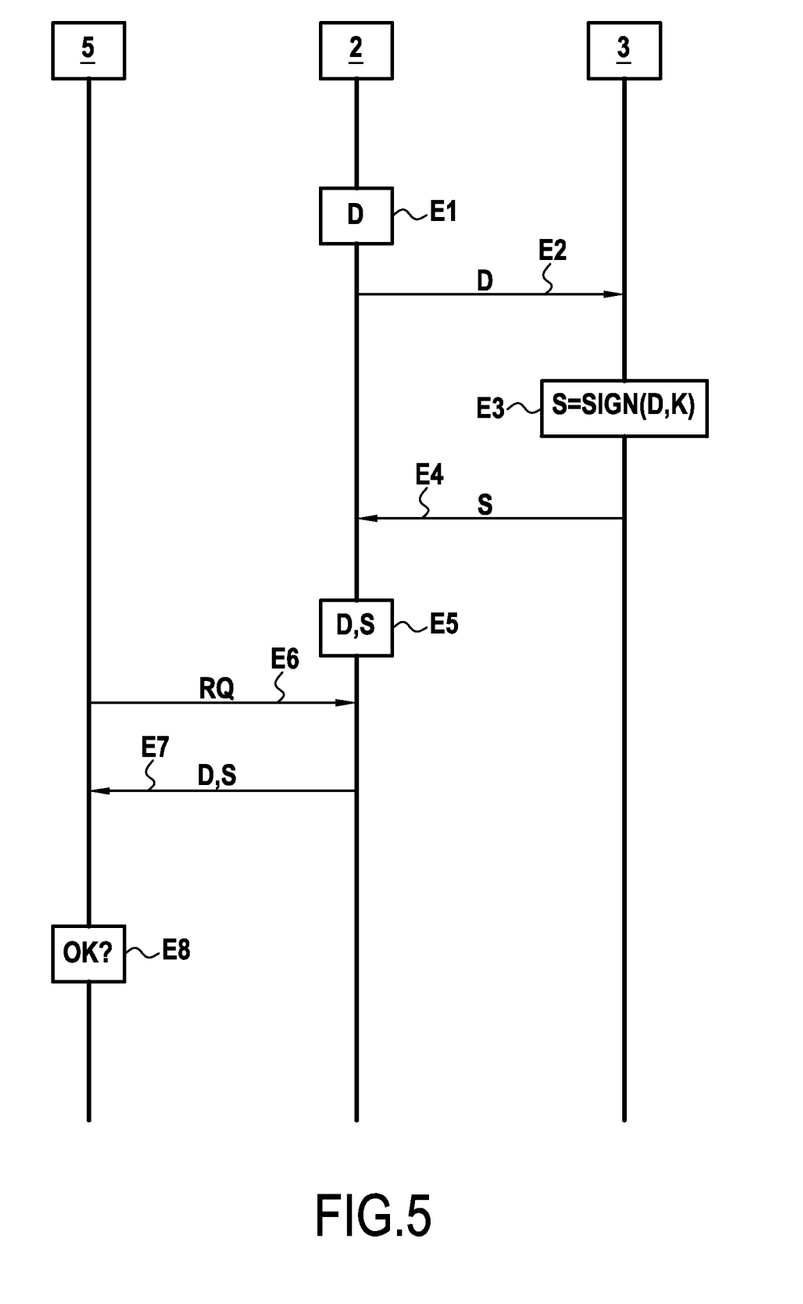
FIG. 5 shows the conduct of communication between the vehicle and the FIG. 1 verification device.

FIG. 5 shows the conduct of communication between the equipment 2, the chronotachograph 3, and the verification device 5.

Initially, the equipment 2 generates data, referenced D (step E1). By way of example, this data may be generated by the position-determining device 24. Thereafter, the equipment 2 sends the data D to the chronotachograph 3 (step E2).

In response to receiving the data D, the chronotachograph 3 uses the signature module 34 and the key K to determine a signature for the data D, which signature is referenced S (step E3). The chronotachograph 3 sends the signature S to the on-board equipment 2 (step E4).

In response to receiving the signature S, the on-board equipment 2 stores the data D together with the signature S (step E5), e.g. in the non-volatile memory 22.

Subsequently, the verification device 5 sends a request RQ to the equipment 2 (step E6). In response to receiving the request RQ, the on-board equipment 2 sends the data D and the signature S to the verification device 5 (step E7). Nevertheless, step E6 (sending the request RQ) does not necessarily occur: in certain applications, the equipment 2 may itself decide to send the data to the verification device 5, e.g. when its memory is nearly full.

Thereafter, the verification device 5 verifies the integrity of the data D as a function of the signature S and the public key $K_{pub}$ associated with the key K.

In the absence of fraud, the data D generated in step E1 and transmitted to the chronotachograph 3 is the same as the data D transmitted to the verification device 5 in step E7. Thus, in step E8, the verification device 5 observes that the data D and the signature S correspond and therefore concludes that the data is not corrupted.

In contrast, in the event of fraud, e.g. in the event of the data D that was stored in step E5 being modified before being transmitted in step E7, the data D generated in step E1 and transmitted to the chronotachograph 3 is not the same as the data D transmitted to the verification device 5 in step E7. As a result, in step E8, the verification device 5 observes that the data D and the signature S do not match and thus concludes that the data has been corrupted.

By using the signature module 34 and the key K of the chronotachograph 3, the data D generated by the on-board equipment 2 can be signed without requiring a private key and a signature module that are specific to the on-board equipment. In other words, the invention makes it possible to share the infrastructure associated with the asymmetric-key cryptographic mechanism of the chronotachograph. There is no need to distribute private keys that are specific to the on-board equipment in the vehicles of a fleet.

The steps of generating the data D (E1), of sending the data D (E2), of receiving the signature S (E4), of storing the data D and the signature S (E5), of receiving the request RQ (E6), and of sending the data D and the signature S (E7), are the main steps of a storage method in accordance with the invention as performed by the on-board equipment 2. This storage method corresponds for example to a computer program stored in the non-volatile memory 22 and executed by the equipment 2.

In similar manner, the steps of receiving the data D (E2), of determining the signature S (E3), and of sending the signature S (E4), are the main steps of a signing method in accordance with the invention, and they are performed by the chronotachograph 3. By way of example, this signing method corresponds to a computer program stored in the memory 33 and executed by the chronotachograph 3.

Also, in similar manner, the steps of sending the request RQ (E6), of receiving the data D and the signature (E7), and of performing verification (E8), are the main steps of a verification method performed by the verification device 5. By way of example, this verification method corresponds to a computer program stored in the non-volatile memory 52 and executed by the verification device 5.

Figure 6:
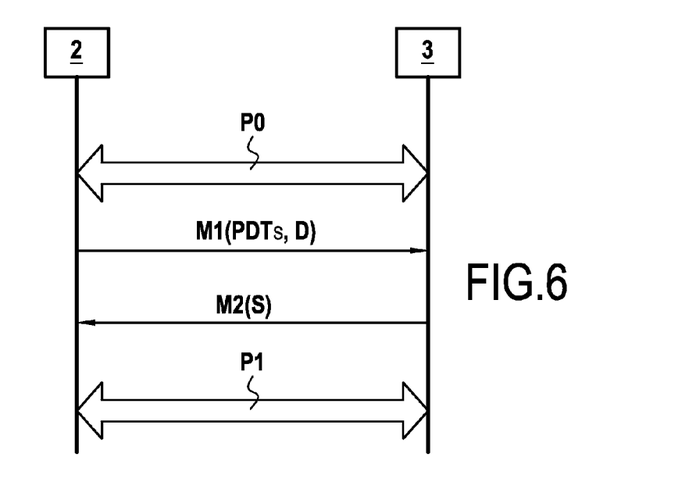
FIGS. 6 and 7 show in greater detail the conduct of communication between the on-board equipment and the chronotachograph of the FIG. 1 vehicle.
Figure 7:
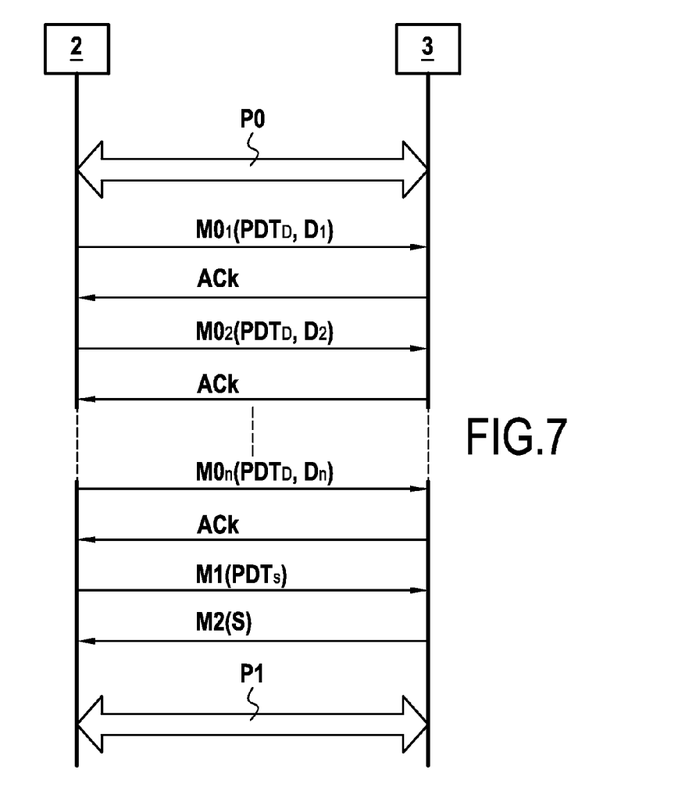

With reference to FIGS. 6 and 7, there follows a description in greater detail of communication between the equipment 2 and the chronotachograph 3, i.e. of steps E2 and E4, in the event of this communication being carried out using a modified version of the standardized protocol described in Annex 1B of Regulation (EEC) No. 3821/85.

In similar manner, Annex 1B of Regulation (EEC) No. 3821/85 describes a communications protocol between a vehicle unit (VU) and intelligent dedicated equipment (IDE). After communication has been established and a session has been opened, the messages sent by the IDE to the VU contain an "information" field that includes a transfer request parameter byte referenced TRTP. The byte TRTP distinguishes between six types of transfer request. Thus, depending on the value of the byte TRTP, the VU responds in corresponding manner. The messages sent by the VU to the IDE contain an "information" field that includes a transfer response parameter byte, reference TREP. The "information" field presents a maximum size of 254 bytes. In addition to the byte TRTP or TREP, it may thus contain 253 data bytes.

In an implementation, the present invention proposes defining an additional value for the field TRTP, referenced $PDT_S$, and corresponding to a request for a signature, and an additional value for the field TRTP, referenced $PDT_D$, and corresponding to a request to submit long data. The chronotachograph 3 corresponds to the VU and the on-board equipment 2 corresponds to the IDE.

FIG. 6 shows communication between the equipment 2 and the chronotachograph 3 when signing short data D. The term "short" data is used to mean data D of a size that is less than or equal to 253 bytes.

The communication begins with a stage P0 during which the equipment 2 requests for communication to be established, for a diagnosis session to be opened, requests downloading, and requests the transfer of summary data. It is assumed that the chronotachograph 3 gives a positive response to each of these requests and transmits the summary data, which may be subdivided as a plurality of messages. This stage P0 takes place in accordance with the above-mentioned standardized protocol and is therefore not described in detail.

Thereafter, the on-board equipment 2 sends a message M1 to the chronotachograph 3, in which message the "INFORMATION" field includes the data D and the byte TRTP of value $PDT_S$, i.e. the new value proposed by the present invention for requesting the transfer of a signature. In response to receiving the message M1, the chronotachograph 3 observes that the byte TRTP has the value $PDT_S$ and therefore deduces that it must sign the data D. Thereafter, it responds with a message M2 containing the signature S that it has determined. Typically, the signature S presents a size of 128 bytes and is therefore suitable for being transmitted in the "INFORMATION" field.

During a stage P1, the remainder of the communication comprises in particular an end-of-transfer request and a request to stop communication. This stage P1 is conducted in accordance with the above-mentioned standardized protocol and is therefore not described in detail.

FIG. 7 shows communication between the equipment 2 and the chronotachograph 3 when signing long data D. The term "long" data is used herein to mean data D of size greater than 253 bytes.

As in FIG. 6, the communication begins with a stage P0 during which the equipment 2 requests that communication be established, requests opening of a diagnosis session, requests downloading, and requests the transfer of summary data. It is assumed that the chronotachograph 3 gives a positive response to each of these requests and transmits the summary data, which may be subdivided as a plurality of messages. This stage P0 is likewise conducted in accordance with the above-mentioned standardized protocol and is therefore not described in detail.

Thereafter, the on-board equipment 2 sends a succession of messages $M0_1, M0_2, \ldots, M0_n$, to the chronotachograph 3. In each message $M0_i$, the "INFORMATION" field includes the byte TRTP of value $PDT_D$, i.e. the new value proposed by the present invention for requesting data submission, and a portion $D_i$ of the data D. Thus, by fragmenting the data D into a plurality of portions $D_i$ of size less than or equal to 253 bytes, it is possible to transmit all of the data D. Each message $M0_2$ is acknowledged by a message ACK.

Thereafter, the on-board equipment 2 sends a message M1 to the chronotachograph 3, in which the "INFORMATION" field includes the byte TRTP of value $PDT_S$, i.e. the new value proposed by the present invention for requesting the transfer of a signature. In the example described, the byte $PDT_S$ is the same both for short data and for long data, and the chronotachograph 3 can distinguish between those circumstances as a function of the long data that it has just received. In a variant, the byte TRTP sent to request the signature of long data is different from the byte TRTP sent to request a signature of short data.

In response to receiving the message M1, the chronotachograph 3 observes that the byte TRTP has the value $PDT_S$, and thus deduces that it is to sign the data D. Thereafter, it responds with a message M2 containing the signature S that it has determined.

Thereafter, during a stage P1, the communication comprises in particular an end-of-transfer request, and a request to stop communication. This stage P1 is conducted in accordance with the above-mentioned standardized protocol and is therefore not described in detail.

In FIG. 6, the transmission of the message M1 corresponds to the step E2, and the transmission of the message M2 corresponds to the step E4 of FIG. 5. In FIG. 7, the transmission of the messages $M0_i$ corresponds to the step E2, and the transmission of the message M2 corresponds to the step E4 of FIG. 5.

The use of a modified version of the above-mentioned standardized protocol serves to facilitate co-operation between on-board equipment and chronotachographs, some of which handle the modified version of the protocol while others handle only the standardized version.

The invention claimed is:

1. A data storage method performed by on-board equipment in a vehicle, the on-board equipment being external to an electronic chronotachograph in the vehicle, the method comprising:
    sending data for signing to the electronic chronotachograph on board the vehicle, wherein sending data for signing to the electronic chronotachograph comprises sending a data signature request message to the electronic chronotachograph when the data is short data of a size less than or equal to 253 bytes and sending at least one data submission request message to the electronic chronotachogram when the data is long data of a size greater than 253 bytes, and wherein a value of a byte of the data signature request message or the at least one data submission request message is adapted to allow the electronic chronotachograph to receive data for signature from an electronic device;
    receiving a signature of the data from the electronic chronotachograph;
    storing the data and the signature in a memory of the on-board equipment external to the electronic chronotachograph; and
    transmitting the stored data and signature to a verification device.

2. A storage method according to claim 1, wherein the process of sending data comprises sending to the electronic chronotachograph the at least one data submission request message together with at least some of the data for signing.

3. A storage method according to claim 2, wherein the process of sending data comprises sending to the electronic chronotachograph a message requesting a transfer of a signature for data that is sent together with the at least one data submission request message.

4. A storage method according to claim 2, wherein a format of the at least one data submission request message or data signature request message complies with the standardized protocol described in Annex 1B of Regulation (EEC) No. 3821/85, a value of a "TRTP" byte of the at least one data submission request message or data signature request message having a value that is not defined in the standardized protocol.

5. The method of claim 4, wherein the value of the "TRTP" byte of the data signature request message corresponds to a request for signature.

6. The method of claim 4, wherein the value of the "TRTP" byte of the data submission request message corresponds to a request to submit long data having a size greater than 253 bytes.

7. The method of claim 4, wherein the value of the "TRTP" byte of the data signature message corresponds to a request for signature and the value of the "TRTP" byte of the data submission request message corresponds to a request to submit long data having a size greater than 253 bytes.

8. A non-transitory computer readable storage medium including instructions for executing the storage method according to claim 1 when the instructions are executed by a computer.

9. The method of claim 1, wherein the verification device is configured to compare the data received from the on-board equipment to the data signed by the chronotachograph in order to determine whether the data received from the on-board equipment is fraudulent.

10. The method of claim 1, wherein the on-board equipment and the chronotachograph communicate with each other via a front-face connector on the chronotachograph which is adapted to extract data generated by the chronotachograph.

11. The method of claim 10, wherein:
the on-board equipment sends the data for signing to the chronotachograph via the front-face connector on the chronotachograph; and
the on-board equipment receives the signature of the data from the chronotachograph via the front-face connector on the chronotachograph.

12. The method of claim 1, wherein receiving a signature of the data from the electronic chronotachograph comprises receiving a signature of the data from the electronic chronotachograph generated based on a key of the chronotachograph.

13. The method of claim 1, wherein receiving a signature of the data from the electronic chronotachograph comprises receiving a signature of the data from the electronic chronotachograph generated based on a key of the chronotachograph, and wherein sending data for signing to the electronic chronotachograph does not include sending a key specific to the on-board equipment.

14. The method of claim 1, wherein sending data for signing to the electronic chronotachograph on board the vehicle comprises:
fragmenting the data into a plurality of data portions of size less than or equal to 253 bytes, and
sending a plurality of messages to the chronotachograph, each of the plurality of messages including:
a byte "TRTP" presenting a value that is not defined in the standardized protocol described in Annex 1B of Regulation (EEC) No. 3821/85, and
one of the plurality of data portions.

15. A computer comprising a hardware processor and a memory, the computer having stored thereon a program including instructions for executing a storage method when the program is executed by the computer, the storage method being performed by an on-board equipment in a vehicle, the on-board equipment being external to an electronic chronotachograph in the vehicle, wherein the storage method comprises:
sending data for signing to the electronic chronotachograph on board said vehicle wherein sending data for signing to the electronic chronotachograph comprises sending a data signature request message to the electronic chronotachograph when the data is short data of a size less than or equal to 253 bytes and sending at least one data submission request message to the electronic chronotachogram when the data is long data of a size greater than 253 bytes, and wherein a value of a byte of the data signature request message or the at least one data submission request message is adapted to allow the electronic chronotachograph to receive data for signature from an electronic device;
receiving a signature of the data from the electronic chronotachograph;
storing the data and the signature in a memory of the on-board equipment external to the electronic chronotachograph; and
transmitting the stored data and signature to a verification device.

16. Equipment for use on board a vehicle, the equipment being external to an electronic chronotachograph in the vehicle, wherein the equipment comprises:
a microprocessor and a memory and wherein:
the equipment is configured to send data for signing to the electronic chronotachograph on board the vehicle, wherein sending data for signing to the electronic chronotachograph comprises sending a data signature request message to the electronic chronotachograph when the data is short data of a size less than or equal to 253 bytes and sending at least one data submission request message to the electronic chronotachogram when the data is long data of a size greater than 253 bytes, and wherein a value of a byte of the data signature request message or the at least one data submission request message is adapted to allow the electronic chronotachograph to receive data for signature from an electronic device;
the equipment is configured to receive a signature of the data from the electronic chronotachograph;
the memory of the equipment external to the electronic chronotachograph is configured to store the data and the signature; and
the equipment is configured to transmit the stored data and signature to a verification device.

17. The equipment of claim 16, wherein the equipment is integrated into the vehicle.

18. The equipment of claim 17 wherein the equipment is connected to the electronic chronotachograph.

19. The equipment of claim 16, wherein the equipment is configured to transmit the stored data and signature to a verification device which is configured to compare the data received from the equipment to the data signed by the chronotachograph in order to determine whether the data received from the equipment is fraudulent.

20. The equipment of claim 16, wherein the equipment is configured to communicate with the chronotachograph via a front-face connector on the chronotachograph which is adapted to extract data generated by the chronotachograph.

21. The equipment of claim 16, wherein the data signature request message or the at least one data submission request message has a format in compliance with the standardized protocol described in Annex 1B of Regulation (EEC) No. 3821/85, and wherein the value of the byte of the data signature request message or the at least one data submission request message adapted to allow the electronic chronotachograph to receive data for signature from an electronic device comprises a value of a "TRTP" byte of the data signature request message or the at least one data submission request message in accordance with a modified version of the standardized protocol.

22. The equipment of claim 21, wherein the value of the "TRTP" byte of the data signature request message corresponds to a request for signature.

23. The equipment of claim 21, wherein the value of the "TRTP" byte of the at least one data submission request message corresponds to a request to submit long data having a size greater than 253 bytes.

24. A signing method performed by an electronic chronotachograph on board a vehicle, the method comprising:
receiving data for signing from an equipment on board the vehicle, the equipment being external to the electronic chronotachograph and having a memory;
determining a signature for the data based on a key corresponding to the chronotachograph; and
sending the signature to the equipment for storage in the memory, wherein receiving data for signing from the equipment comprises receiving a data signature request message from the equipment when the data is short data of a size less than or equal to 253 bytes and receiving at least one data submission request message from the equipment when the data is long data of a size greater than 253 bytes, and wherein a value of a byte of the data signature request message or the at least one data submission request message is adapted to allow the electronic chronotachograph to receive data for signature from an external device.

25. A signing method according to claim 24, wherein receiving data comprises receiving at least one message of a format in compliance with the standardized protocol described in Annex 1B of Regulation (EEC) No. 3821/85, a byte "TRTP" of the message presenting a value that is not defined in the standardized protocol.

26. The method according to claim 24, wherein the method is executed by a processor in the chronotachograph.

27. A non-transitory computer readable data medium including instructions for executing the method according to claim 24 when the instructions are executed by a processor in the chronotachograph.

28. The method of claim 24, wherein the equipment and the chronotachograph communicate with each other via a front-face connector on the chronotachograph which is adapted to extract data generated by the chronotachograph.

29. The method of claim 24, wherein a format of the at least one data submission request message or the data signature request message complies with the standardized protocol described in Annex 1B of Regulation (EEC) No. 3821/85.

30. The method of claim 24, wherein the value of a "TRTP" byte of the data signature request message corresponds to a request for signature.

31. The method of claim 24, wherein the value of a "TRTP" byte of the at least one data submission request message corresponds to a request to submit short data having a size of 253 bytes.

32. An electronic chronotachograph for use on board a vehicle, the chronotachograph comprising:
a microprocessor and a memory wherein
the chronotachograph is configured to:
receive data for signing from an equipment on board the vehicle, the data being generated by the equipment, the equipment being external to the chronotachograph and having a memory;
determine a signature for the data based on a key corresponding to the chronotachograph; and
send the signature to the equipment wherein the signature is stored in the memory of the equipment,
the chronotachograph further configured to receive a data signature request message from the equipment when the data is short data and receive at least one data submission request message from the equipment when the data is long data, wherein the data signature request message and the data submission request message each has a format in compliance with the standardized protocol described in Annex 1B of Regulation (EEC) No. 3821/85, and wherein a value of a "TRTP" byte of the data signature request message and the data submission request message is in accordance with a modified version of the standardized protocol adapted to allow the electronic chronotachograph to receive data for signature from an external device.

33. The electronic chronotachograph of claim 32, wherein the value of the "TRTP" byte of the data signature request message corresponds to a request for signature.

34. The electronic chronotachograph of claim 32, wherein the value of the "TRTP" byte of the data request message corresponds to a request to submit data having a size greater than 253 bytes.

35. An electronic chronotachograph for use on board a vehicle, the chronotachograph comprising:
a microprocessor and a memory wherein the chronotachograph is configured to:
receive data for signing from an equipment on board the vehicle, the data being generated by the equipment, the equipment being external to the chronotachograph and having a memory,
wherein receiving data for signing from the equipment comprises receiving a data signature request message from the equipment when the data is short data of a size less than or equal to 253 bytes and receiving at least one data submission request message from the equipment when the data is long data of a size greater than 253 bytes, and wherein a value of a byte of the data signature request message or the at least one data submission request message is adapted to allow the electronic chronotachograph to receive data for signature from an external device;
determine a signature for the data based on a key corresponding to the chronotachograph; and
send the signature to the equipment for storage in the memory of the equipment.

36. The electronic chronotachograph of claim 35, wherein the electronic chronotachograph is configured to communicate with the equipment via a front-face connector on the chronotachograph which is adapted to extract data generated by the chronotachograph.

37. The electronic chronotachograph of claim 35, wherein a format of the at least one data submission request message or the data signature request message complies with the standardized protocol described in Annex 1B of Regulation (EEC) No. 3821/85, and wherein the value of the byte of the data signature request message or the at least one data submission request message adapted to allow the electronic chronotachograph to receive data for signature from an electronic device comprises a value of a "TRTP" byte of the data signature request message and the at least one data submission request message is in accordance with a modified version of the standardized protocol.

\* \* \* \* \*